United States Patent
Nakano et al.

(10) Patent No.: US 7,266,654 B2
(45) Date of Patent: Sep. 4, 2007

(54) STORAGE SYSTEM, SERVER APPARATUS, AND METHOD FOR CREATING A PLURALITY OF SNAPSHOTS

(75) Inventors: Takahiro Nakano, Yokohama (JP); Junichi Hara, Yokohama (JP); Tsuyoshi Aoyama, Yokohama (JP); Koji Sonoda, Sagamihara (JP); Yoshiaki Eguchi, Machida (JP); Takashi Horiuchi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/808,921

(22) Filed: Mar. 24, 2004

(65) Prior Publication Data

US 2005/0027819 A1    Feb. 3, 2005

Related U.S. Application Data

(63) Continuation-in-part of application No. 10/651,633, filed on Aug. 29, 2003.

(30) Foreign Application Priority Data

| Mar. 18, 2003 | (JP) | ............................. 2003-073101 |
| Jun. 13, 2003 | (JP) | ............................. 2003-168589 |
| Jan. 29, 2004 | (JP) | ............................. 2004-021104 |

(51) Int. Cl.
*G06F 12/00* (2006.01)

(52) U.S. Cl. ...................... 711/162; 711/112; 707/204; 707/203; 709/217

(58) Field of Classification Search ................ 711/112, 711/114, 170, 161, 162; 707/204, 205, 203; 709/217
See application file for complete search history.

(56) References Cited

U.S. PATENT DOCUMENTS

| 5,403,639 | A | * | 4/1995 | Belsan et al. ............... 707/204 |
| 5,649,152 | A | | 7/1997 | Ohran et al. |
| 5,720,026 | A | | 2/1998 | Uemura et al. |

(Continued)

FOREIGN PATENT DOCUMENTS

JP    2002-278819 A    9/2002

OTHER PUBLICATIONS

Common Internet File System (CIFS) Version: CIPS-Spec 0.9, Storage Networking Industry Association (SNIA), Draft SNIA CIFS Documentation Work Group Work-in-Progress, Revision Date: Mar. 26, 2001.*

(Continued)

*Primary Examiner*—Pierre-Michel Bataille
(74) *Attorney, Agent, or Firm*—Townsend and Townsend and Crew LLP

(57) ABSTRACT

In a storage system with a server apparatus having at least one CPU, a memory, at least one network interface, and at least one storage interface, and, at least one disk connected to the storage interface, the server apparatus has a snapshot management part which maintains and manages snapshot of the disk apparatus, the disk apparatus has an operational volume which performs ordinary read/write and a differential volume which stores differential data of snapshot of the operational volume, the snapshot management part stores data on the operational volume in the differential volume, provides a preceding copy area to store its location information, and when free area on the differential volume becomes insufficient discards the stored location information and uses the preceding copy area as an free area.

5 Claims, 11 Drawing Sheets

U.S. PATENT DOCUMENTS

| | | | |
|---|---|---|---|
| 5,819,292 | A | 10/1998 | Hitz et al. |
| 5,963,962 | A | 10/1999 | Hitz et al. |
| 6,185,665 | B1 | 2/2001 | Owada et al. |
| 6,205,450 | B1 | 3/2001 | Kanome |
| 6,341,341 | B1 | 1/2002 | Grummon et al. |
| 6,473,775 | B1 * | 10/2002 | Kusters et al. ............... 707/200 |
| 6,557,024 | B1 | 4/2003 | Saito et al. |
| 6,594,744 | B1 | 7/2003 | Humlicek et al. |
| 6,651,075 | B1 * | 11/2003 | Kusters et al. ............... 707/204 |
| 6,665,815 | B1 | 12/2003 | Goldstein et al. |
| 6,704,755 | B2 * | 3/2004 | Midgley et al. ............ 707/204 |
| 6,799,258 | B1 | 9/2004 | Linde |
| 7,032,090 | B2 * | 4/2006 | Hulsey ........................ 711/162 |
| 7,111,194 | B1 * | 9/2006 | Schoenthal et al. ............. 714/7 |
| 7,146,474 | B2 * | 12/2006 | Nguyen et al. ............. 711/162 |
| 2003/0191840 | A1 | 10/2003 | Maciel |
| 2003/0229651 | A1 | 12/2003 | Mizuno et al. |
| 2004/0030727 | A1 * | 2/2004 | Armangau et al. ......... 707/200 |
| 2004/0133602 | A1 * | 7/2004 | Kusters et al. ........... 707/104.1 |
| 2004/0267836 | A1 * | 12/2004 | Armangau et al. ......... 707/203 |
| 2005/0015663 | A1 | 1/2005 | Armangau et al. |

OTHER PUBLICATIONS

Nabil Osorio and Bill Lee, Guidelines for Using Snapshot Storage Systems for Oracle Databases, Oracle Corporation, Oct. 2001, pp. 12.*

Disaster Recovery Guidelines for using HP SureStore E XP256, Continuous Access XP with Oracle Databases Rev 1.03, Hewlett-Packard Company, Palo Alto, CA, May 2000, pp. 1-28.*

Remote Mirroring Technical White Paper, Copyright 1994-2002 Sun Microsystems, published at least as early as May 17, 2002 at sun.com, 25 pages.*

Leveraging SnapView/IP in Oracle8i Environments with the CLARiiON IP4700 File Server, Engineering White Paper, EMC Corporation, Hopkinton, MA, Feb. 13, 2002, pp. 1-16.*

* cited by examiner

FIG. 3

| OPERATIONAL VOLUME BLOCK ADDRESS | CoW BIT MAP | VIRTUAL VOLUME 1 | VIRTUAL VOLUME 2 | ... | VIRTUAL VOLUME n |
|---|---|---|---|---|---|
| 0 | 00···0 | 0 | 0 | ... | 0 |
| 1 | 00···1 | 1 | 2 | ... | NONE |
| 2 | 11···1 | NONE | NONE | ... | NONE |
| ... | ... | ... | ... | ... | ... |
| m−1 | 11···1 | NONE | NONE | ... | NONE |

SNAPSHOT MANAGEMENT TABLE

FIG. 4

| DIFFERENTIAL VOLUME BLOCK ADDRESS (411) | POSSESSION BIT MAP (412) | PRECEDING COPY AREA ADDRESS (413) | |
|---|---|---|---|
| 0 | 11⋯1 | NONE | 401 |
| 1 | 10⋯0 | NONE | 402 |
| 2 | 01⋯0 | NONE | 403 |
| 3 | 00⋯0 | 2 | 404 |
| 4 | 00⋯0 | NONE | 405 |
| ⋮ | ⋮ | ⋮ | |
| p−1 | 00⋯0 | NONE | 406 |

212

DIFFERENTIAL BLOCK MANAGEMENT TABLE

STORAGE SYSTEM, SERVER APPARATUS, AND METHOD FOR CREATING A PLURALITY OF SNAPSHOTS

REFERENCE TO RELATED APPLICATION

This application is a continuation-in-part of copending U.S. application Ser. No. 10/651,633 filed on Aug. 29, 2003, the disclosure of which is hereby incorporated by reference.

BACKGROUND OF THE INVENTION

The present invention relates to a storage system having a snapshot function of volume image in a computer system using storage, and in particular, to a technique which utilizes a differential volume which stores snapshots as a preceding copy area.

In the information-oriented society, one of the important roles of a storage system which stores information is data protection. The most typical method for data protection is backup, whereby data on the storage are preserved on a backup medium such as tape. Even if data on the storage under operation should be lost by a failure, a trouble, or an operation mistake, it is possible to recover data obtained at the time of preservation by restoring the backup and damage can be kept to a minimum.

However, as capacities of storages are increased, time required for backup is becoming a problem. Further, in application where the update frequency of data is high, even if backup is taken once the difference from the backup expands soon and damage would be greater in case of emergency, therefore it has become necessary to take the backup frequently. Furthermore, by way of precaution against file loss caused by an operation mistake and against a desire to compare contents of a file with the past state, there is a demand for capability of easy reference to periodic backup.

As a function that meets such application, a snapshot function is attracting attention. The snapshot function is a function of maintaining a point-in-time data image on a storage under operation when a snapshot is taken and making the point-in-time data image accessible by using means different from the storage under operation. The snapshot minimizes backup time, which posed a problem in tape backup, by making data usable at the time of taking without waiting completion of copying the whole data on the storage.

A method of using a preservation storage area for preserving data obtained at the time of snapshot in order to maintain the snapshot is described in U.S. Pat. No. 5,649,152.

According to this method, if a snapshot of an operational volume is taken then at the time of update of a block that occurs thereafter and that is not yet updated, old data of the block is copied to the preservation storage area and a virtual volume for providing the snapshot is generated. As for reading from the virtual volume, if a block associated with an address to be read out has been already copied to the preservation storage area, the block is returned. If the copy is not present in the preservation storage area, then an alteration has not occurred in the operational volume, and consequently a block associated with the same address in the operational volume is returned.

According to this technique, compared to the case where the whole data on the operational volume is preserved in another volume at the time of snapshot taking, it is possible to maintain image of the operational volume at the time of snapshot taking with less storage capacity.

SUMMARY OF THE INVENTION

Operational forms of a storage using snapshot are diversified. For example, there is an operation form in which a snapshot is taken every day and the snapshots are maintained for one month. There is an operation form in which a snapshot is taken once an hour, and snapshots taken hour after hour are maintained within 24 hours, whereas snapshots taken day after day are maintained within one week, respectively. There is a problem that the capacity of the preservation storage area increases when maintaining a plurality of snapshots as described above.

An object of the present invention is to make it possible to maintain a plurality of snapshots at an arbitrary point of time with less storage capacity without affecting block arrangement of the original volume and file system.

According to one aspect of the present invention, in a storage system comprising a server apparatus including at least one CPU, a memory, at least one network interface, and at least one storage interface, and, at least one disk connected to the storage interface, the server apparatus includes a snapshot management part which maintains and manages snapshot of the disk apparatus, the disk apparatus includes an operational volume which performs ordinary read/write and a differential volume which stores differential data of snapshot of the operational volume, the snapshot management part stores data on the operational volume in the differential volume, provides a preceding copy area to store its location information, and when free area on the differential volume becomes insufficient discards the stored location information and uses the preceding copy area as an free area.

According to the present invention, it is possible to maintain and provide a plurality of snapshots with less storage capacity by preparing one differential volume for the operational volume which is the object of snapshot.

Other objects, features and advantages of the invention will become apparent from the following description of the embodiments of the invention taken in conjunction with the accompanying drawings.

BRIEF DESCRIPTION OF THE DRAWINGS

FIG. 3 is an illustrative diagram showing details of a snapshot management table 211 of the first embodiment.

FIG. 4 is an illustrative diagram of a differential block management table 212 of the first embodiment.

DESCRIPTION OF THE EMBODIMENTS

Hereafter, embodiments of the present invention will be described with reference to the figures.

Figure 1:
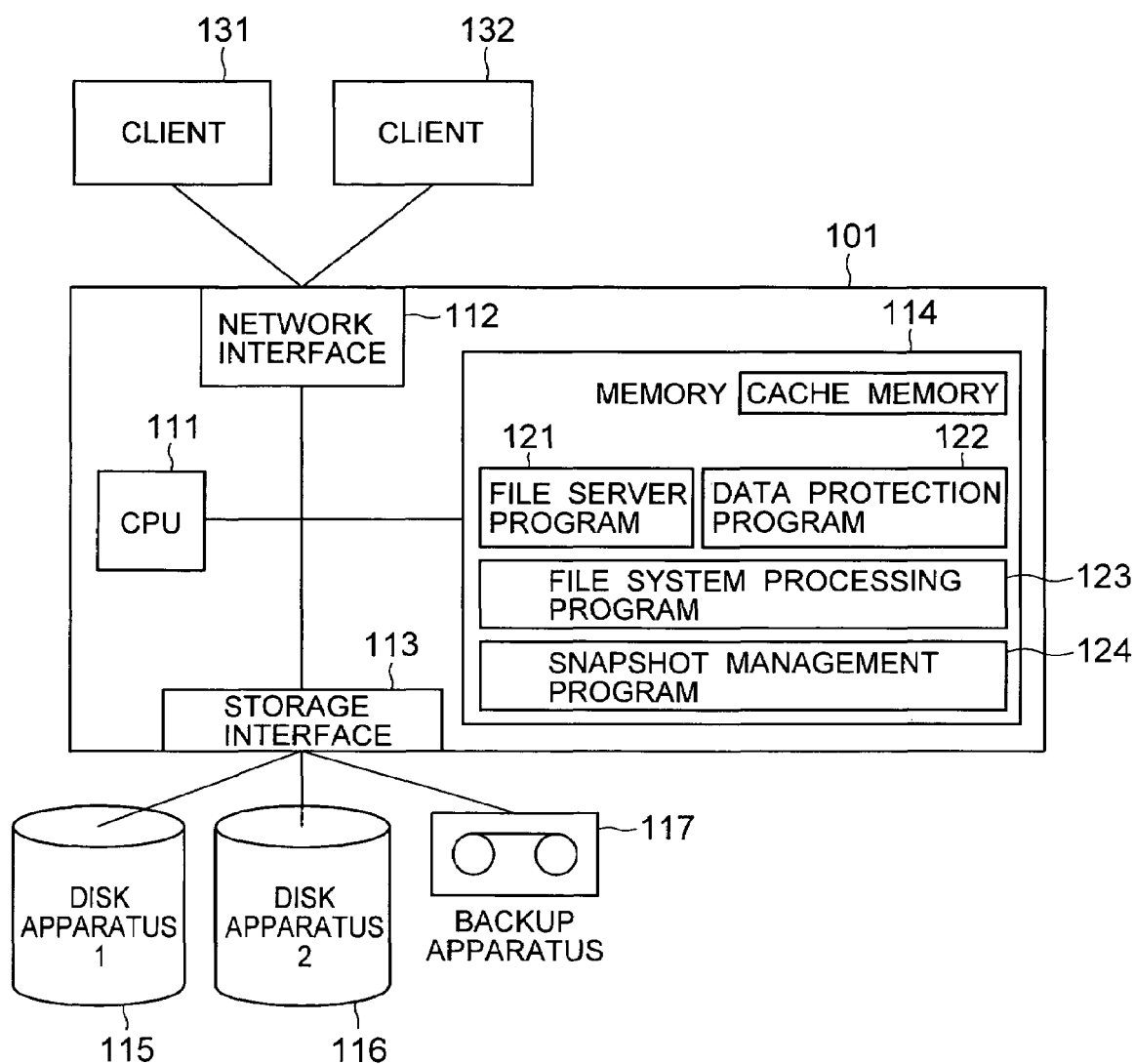
FIG. 1 is a block diagram showing a configuration of a storage system of a first embodiment of the present invention.

FIG. 1 is a block diagram showing a configuration of a storage system of a first embodiment of the present invention.

A server apparatus 101 provides clients 131, 132 connected thereto via a network interface 112 with file share service.

The server apparatus 101 includes at least one CPU 111, at least one network interface 112, at least one storage interface 113, and a memory 114.

The network interface 112 sends and receives signals (command, data) to and from the clients 131, 132 by the TCP/IP protocol.

The storage interface 113 sends and receives signals (command, data) based on the SCSI (Small Computer System Interface) to and from disk apparatuses 115, 116. To the storage interface 113 the disk apparatuses 115, 116 and a backup apparatus 117 are connected.

In the memory 114, a file server program 121, a data protection program 122, a file system processing program 123, and a snapshot management program 124 are stored, and a plurality of kinds of process are performed by the CPU 111 calling and executing these programs.

In response to a data access request from the client 131 or 132, the file server program 121 requests the file system processing program 123 to execute file or directory reading or writing processing, and returns its result to the client 131 or 132 which is the request source.

The data protection program 122 requests the snapshot management program 124 to take or delete a snapshot, and, issues a file read request for a specified file to the file system processing program 123 to write data read out to the backup apparatus 117, and creates a duplicate of the data (takes a backup).

In response to the file server program 121 or a file or directory reading and writing processing request issued by the data protection program 122, the file system processing program 123 issues data reading and writing processing to the snapshot management program 124 by specifying a volume (an area secured for the specific application on the disk apparatuses 115, 116) which stores file or directory, and position and size of a block to be accessed.

The snapshot management program 124, on receiving a snapshot taking request from the data protection program, takes a snapshot for an operational volume of the disk apparatus 115. The snapshot taking processing makes it possible that the snapshot management program 124 manages, using a snapshot management table 211 which will be described later, the data stored in the operational volume 115 and the differential volume 116 to make the data stored in the operational volume 115 at the time of receiving a snapshot taking request accessible, and to make the virtual volume accessible to provide the taken snapshot of the operational volume 115.

Herein, the term "virtual volume" means a virtual volume consists of one or more storage areas within a disk apparatus, in effect, consists of a part of blocks within the operational volume 115 and a part of blocks within the differential volume.

The snapshot management program 124 manages differential data, i.e., a volume (differential volume) which stores differential data required to maintain snapshots, in addition to a volume (operational volume 115) which stores a file system, etc., and responding to requests from the file system processing program 123, performs processing of data input/output, processing of maintaining the snapshots and processing of making the snapshots usable.

To be more specific, the snapshot management program 124, on receiving a snapshot taking request, first registers identification information of a new virtual volume in the snapshot management table 211 which will be described later. Blocks of the virtual volume are initially made corresponding to blocks in the operational volume 115 one to one by the snapshot management table 211. However, at the time when data in the operational volume 115 is updated, the snapshot management program 124 copies data preceding its update in the operational volume 115 to the differential volume and updates the storage contents of the operational volume 115 after this copy as will be described later. Then, the snapshot management program 124 further updates the snapshot management table 211 so that the block in the virtual volume corresponding to the block in the operational volume 115 with its data updated becomes corresponding to the block on the differential volume in which the data stored in the operational volume 115 at the time when the snapshot taking request was received (i.e., the data preceding its update) is stored.

When the file system processing program 123 issues an access request for the virtual volume to the snapshot management program 124, the snapshot management program 124 references the snapshot management table 211 and accesses a block in the operational volume 115 or a block in the differential volume corresponding to the block in the virtual volume. Therefore, the file system processing program 123 can utilize information in the operational volume 115 at the time when a snapshot taking request is issued by accessing the virtual volume. Thereby, the server apparatus 101 can provide snapshot image of the file system.

Herein, these processes will be described in detail later.

In the present embodiment, an operational volume which stores a file system is assigned to the disk apparatus 115 and a differential volume which stores differential data (differential data required to maintain the snapshots, etc.) is assigned to the disk apparatus 116.

The disk apparatuses 115 and 116 may use independent physical disk drives, respectively. Or it is also possible to divide a single physical disk drive into logical partitions, and use each logical partition as the disk apparatuses 115 and 116. In addition, it is also possible to use a logical disk apparatus which consists of a plurality of disk apparatuses and is logically set as one disk as the disk apparatuses 115 and 116. Further, it is also possible to configure a RAID apparatus by a plurality of physical disk drives which configure a logical disk.

The backup apparatus 117 is an apparatus which stores duplication of data stored in the disk apparatuses 115 and 116. In the present embodiment, the backup apparatus 117 is connected to the storage interface 113 in the server apparatus 101. However, the backup apparatus 117 may be connected to the storage interface, for example, in the client 131 connected to the server apparatus via the network interface 112.

Figure 2:
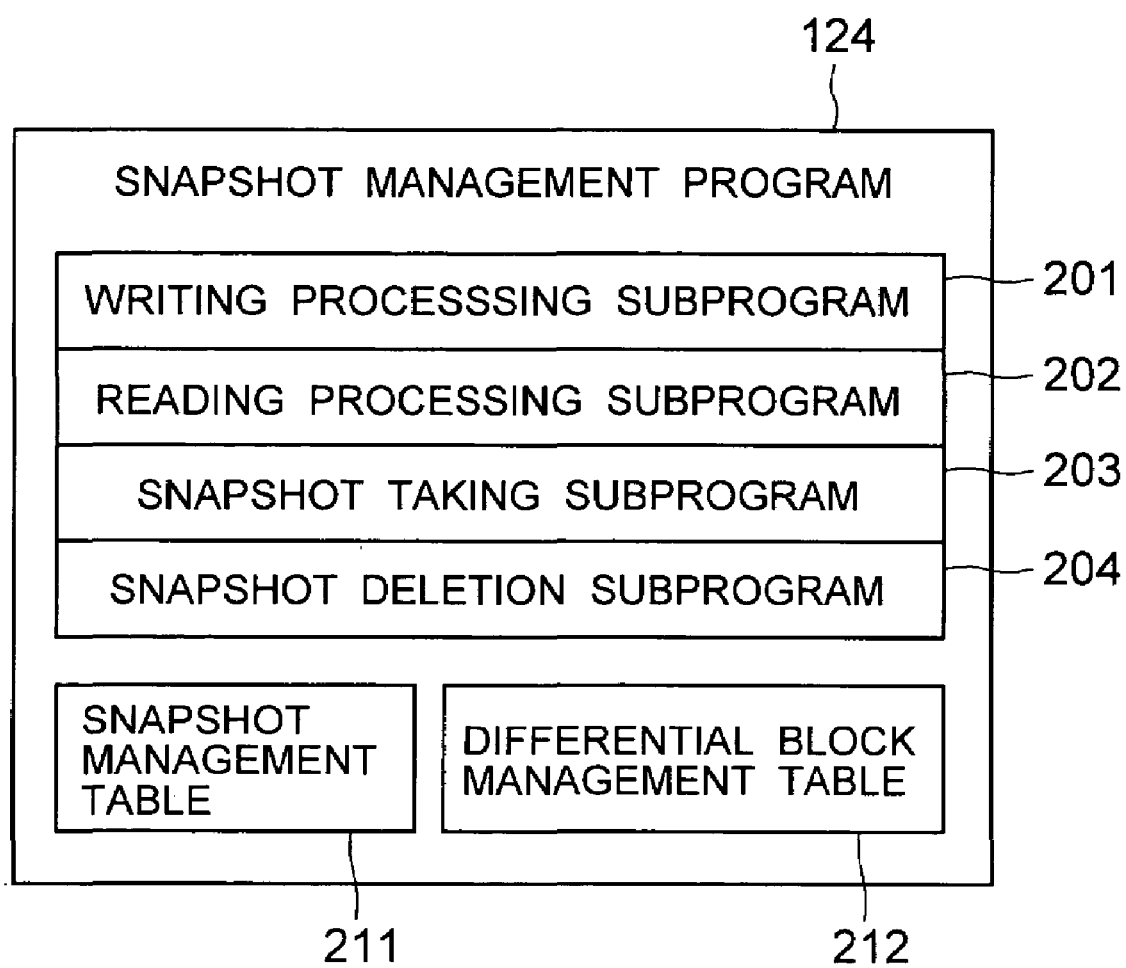
FIG. 2 is a block diagram showing a configuration of a snapshot management program 124 of the first embodiment.

FIG. 2 is a block diagram showing a configuration of the snapshot management program 124 of the first embodiment.

In the snapshot management program 124, a writing processing subprogram 201 and a reading processing subprogram 202 which are called in response to a processing request issued by the file system processing program 123, and a snapshot taking subprogram 203 and a snapshot deletion subprogram 204 which are called in response to a processing request issued by the data protection program 122 are included. Moreover, as information used when these subprograms are executed, a snapshot management table 211 and a differential block management table 212 are stored in the memory 114.

In the snapshot management table 211 (refer to FIG. 3 for the detail) data retained to maintain snapshots and to make the snapshots usable is stored. In the differential block management table 212 (refer to FIG. 4 for the detail) data which manages the block use situation of the differential volume 116 is stored.

FIG. 3 is an illustrative diagram showing details of the snapshot management table 211 of the first embodiment.

In a column 311 of the snapshot management table 211, block addresses in the operational volume 115 are registered, to a first row (the first row) of the first column 311 a first block address, i.e., a block address 0, in the operational volume 115 is assigned, to a second row a block address 1 in the operational volume 115 is assigned, hereafter block addresses in the operational volume 115 are assigned in order, and to an mth row, which is the final row, a block address (m-1) in the operational volume 115 is assigned.

A column 312 is a CoW (copy-on-write) bit map, which will be described later.

In columns after and including a column 313 storage locations of data corresponding to each block address in the virtual volume are registered. For example, in the column 313 the storage location of data of snapshot number 1 is registered (in this case the snapshot number and the number of virtual volume are the same. For example, to the snapshot number 1 the virtual volume 1 corresponds).

In a first row of the column 313 information which identifies a storage area in which data corresponding to the block address 0 in the virtual volume 1 is stored, hereafter the storage location of data corresponding to the block address 1 in the virtual volume is stored in a second row, that of data corresponding to the block address 2 is stored in a third row, and so it continues in order.

To be more specific, 0 which is recorded in the first row of the column 313 as a storage location of data of the block address 0 in the virtual volume 1 corresponds to the block address 0 in the differential volume 116.

When data at the block address 0 in the operational volume 115 is to be updated after the snapshot management program 124 received a snapshot taking request, the snapshot management program 124 writes the data preceding its update which is stored at the block address 0 in the operational volume 115 to the block address 0 in the differential volume 116, and after that updates the data at the block address 0 in the operational volume 115. This is because it is necessary to preserve the data stored in the operational volume 115 at the time when the snapshot taking request is received in any storage area in the disk apparatus to provide access to the snapshot.

In this manner, in the snapshot management table 211 the block address 0 in the virtual volume 1 corresponds to the block address 0 in the differential volume 116. The snapshot management program 124 can obtain the data preceding the update at the block address 0 in the operational volume 115 by accessing the block address 0 of the first row in the virtual volume 1 (i.e., the block address 0 in the differential volume 116).

In this manner, when an access request to the block address 0 in the virtual volume 1 is made, the snapshot management program 124 can access the block address 0 in the differential volume 116 by referring to the snapshot management table 211. As a result, the snapshot management program 124 can provide an access environment for the virtual volume 1 to the file system processing program 123 in the same situation as the data preceding its update at the block address 0 in the operational volume 115 (i.e., the data stored at the block address 0 in the operational volume 115 at the time when the snapshot taking request is received) is written at the block address 0 in the virtual volume 1.

In the same way, 1 which is stored in a second row of the column 313 as a storage location of data at the block address in the virtual volume 1 corresponds to a block address 1 in the differential volume 116. When data at the block address 1 in the operational volume 115 is to be updated after a snapshot taking request is received, the snapshot management program 124 writes the data preceding its update stored at the block address 1 in the operational volume 115 to the block address 1 in the differential volume 116, and after that updates the data at the block address 1 in the operational volume 115. In this manner, in the snapshot management table 211 the block address 1 in the virtual volume 1 corresponds to the block address 1 in the differential volume 116. The snapshot management program 124 can provide an access for the virtual volume 1 to the file system processing program 123 in the same situation as the data preceding its update at the block address 1 in the operational volume 115 is written virtually at the block address 1 in the virtual volume 1.

In rows from third row to m row of the column 313 "none" is recorded as storage location information corresponding to data at block addresses from block address 2 to (m-1) in the virtual volume 1. The "none"0 indicates the corresponding block address in the operational volume 115. Therefore, to the block addresses from 2 to (m-1) in the virtual volume 1, the block addresses from 2 to (m-1) in the operational volume 115 correspond respectively. Namely, "none" indicates that the corresponding block in the operational volume 115 has not been updated (rewritten) after a final snapshot taking request was received.

Consequently, the snapshot management program 124 can provide snapshot images (virtual volume 1) of the operational volume at the time preceding the time when the data at the block addresses 0 and 1 in the operational volume 115 are updated by the data at the block address 0 in the virtual volume 1, the data at the block address 1 in the virtual volume 1 and the data at the block addresses from 2 to (m-1) in the operational volume 115.

In a column 314 storage location of data in the virtual volume 2 is registered.

The snapshot management program 124, every time it receives a snapshot taking request, registers a new virtual volume in the snapshot management table to obtain a snapshot at the time of receiving the snapshot taking request.

The virtual volume 2 is a virtual volume corresponding to a snapshot of a snapshot number 2 taken by the snapshot management program 124 when it receives a snapshot taking request again after a snapshot of snapshot number 1 (corresponding to the virtual volume 1) was taken.

0 which is recorded in a first row of the column 314 as a data storage location of the block address 0 in the virtual volume 2 corresponds to the block address 0 in the differential volume 116.

When data at the block address 0 in the operational volume 115 is to be updated after the second snapshot taking request was received, the snapshot management program 124 copies data preceding its update stored at the block address 0 in the operational volume 115 to the block address 0 in the differential volume 116 as described earlier, and after that updates the data at the block address 0 in the operational volume 115. Thus, the data corresponding to the block addresses 0 in the virtual volume 1 and the virtual volume 2 is supposed to be stored at the block address 0 in the differential volume 116, then the snapshot management program 124 rewrites the snapshot management table so that the block addresses 0 in the virtual volume 1 and the virtual volume 2 correspond to the block address 0 in the differential volume 116.

2 which is recorded in a second row of the column 314 as a storage location of data at the block address 1 in the virtual volume 2 corresponds to the block address 2 in the differential volume 116. This indicates that the data at the block address 1 in the operational volume 115 has been updated after the second snapshot taking request was received. Namely, when data at the block address 1 in the operational volume 115 was updated after the second snapshot taking request was received the data preceding its update is copied to the block address 2 in the differential volume 116. This is because if the data is copied to the block address 1 in the differential volume 116, then the data corresponding to the block address 1 in the virtual volume 1 is to be altered, and the first snapshot data would be damaged.

In rows from third row to m row of the column 314 "none" is recorded as storage location of data at block addresses from block address 2 to (m-1) in the virtual volume 2. This "none" indicates that the block address in the virtual volume corresponds to the corresponding block address in the operational volume 115, as described earlier.

Description of a virtual volume n is similar to the above description of the virtual volumes 1 and 2, and consequently it will be omitted.

A column 312 indicates a CoW (copy-on-write) bit map, and the number of its bits is equal to the number of virtual volumes. In the case showed in FIG. 3, the number of virtual volumes is n, thus, the CoW bit map has n bits. A first bit in the CoW bit map corresponds to the virtual volume 1, a second bit in the CoW bit map corresponds to the virtual volume 2, and hereafter nth bit in the CoW bit map corresponds to the virtual volume n in a same manner. If there is registration of update in a block address of a kth row in a virtual volume (i.e., if the block address in the differential volume 116 is recorded), then a bit in the CoW bit map in the kth row corresponding to the virtual volume is set to "0". If there is no registration of update in the block address of the kth row in the virtual volume (i.e., "none" is recorded), then a bit in the CoW bit map in the kth row corresponding to the virtual volume is set to "1".

Since "0" is assigned to the block address 0 in the first row of each virtual volume in the snapshot management table 211 shown in FIG. 3, each bit in the CoW bit map in the first row becomes all "0". Also, since "none" is assigned to the block address (m-1) in the mth row of each virtual volume, each bit in the CoW bit map in the mth row becomes all "1".

Herein, it is assumed that the size of the operational volume 115 is m blocks and the maximum number of snapshots is n in the snapshot management table 211 shown in FIG. 3. For example, assuming the block size to be 512 bytes, the size of the operational volume 115 to be 128 gigabytes, and the maximum number of snapshots to be 64, it follows that m=250,000,000 and n=64. Herein, the block size, the size of the operational volume 115, and the maximum number of snapshots may be arbitrarily set, because they do not affect the effects of the present invention.

In the snapshot management table 211 shown in FIG. 3, in the first row (301) the column 311 indicates the block address 0 in the operational volume 115, and the column 312 indicates that the CoW bit map is 00 . . . 0. The "0" in the columns 313, 314 and 315 show that contents at the block address 0 in the virtual volumes 1, 2 and n corresponding to the snapshots 1, 2 and n (i.e., data which was stored at the block address 0 in the operational volume 115 at the time when a snapshot taking request of the snapshot corresponding to each virtual volume was issued) are stored in the differential volume 116 at the block address 0.

In the second row (302), the column 311 indicates the block address 1 in the operational volume 115, and the column 312 shows that the CoW bit map is 00 . . . 1. The "1" in the column 313 shows that contents at the block address 1 in the virtual volume 1 corresponding to the snapshot 1 are stored in the differential volume 116 at the block address 1. The "2" in the column 314 shows that contents at the block address 1 in the virtual volume 2 corresponding to the snapshot 2 are stored in the differential volume 116 at the block address 2. The "none" in the column 315 shows that contents at the block address 1 in the virtual volume n corresponding to the snapshot n are stored in the operational volume 115 at the block address 1.

The "none" assigned to the block address 1 in the virtual volume n shows that contents at the block address 1 in the virtual volume n are stored in the operational volume 115 at the block address 1, and that the data at the block address 1 in the operational volume 115 has not been updated after the snapshot taking request for the nth snapshot corresponding to the virtual volume n was received.

In the third row (303), the column 311 indicates the block address 2 in the operational volume 115, and the column 312 shows that the CoW bit map is 11 . . . 1. The column 313, 314 and 315 show that contents at the block address 2 in the virtual volumes 1, 2, and n corresponding to the snapshots 1, 2, and n are stored in the operational volume 115 at the block address 2 (i.e., that the operational volume 115 has not been updated).

In the mth row (304), the column 311 indicates the block address (m-1) in the operational volume 115, and the column 312 shows that the CoW bit map is 11 . . . 1. The columns 313, 314 and 315 show that contents at the block address (m-1) in the virtual volumes 1, 2, and n corresponding to the snapshots 1, 2, and n are stored in the operational volume 115 at the block address (m-1) (i.e., update (rewrite) of the operational volume 115 has not been performed).

In other words, the CoW bit map shown in each of entries in the column 312 is a storage area having at least n bits, which indicates the maximum number of snapshots. Each bit corresponds to a snapshot number, and indicates whether update has been performed since the snapshot was begun to be maintained. In the case shown in FIG. 3, "0" indicates that there is update and "1" indicates that there is no update.

When writing block data to the operational volume 115, the writing processing subprogram 201 references the CoW bit map, and uses it to determine whether data preceding its update at the address to which the data is to be written should be copied to the differential volume or not. By this CoW bit map, it becomes unnecessary to track the snapshot management table to know which block address in the virtual volume of the snapshot to be rewritten every time data is written, and the data writing rate can be improved.

FIG. 4 is an illustrative diagram showing details of the differential block management table 212.

In order to manage the use situation of blocks in the differential volume 116, the differential block management table 212 shows correspondence among a block address 411, a possession bit map 412, and a preceding copy area address 413 with respect to each block provided in the differential volume 116.

The possession bit map shown in each of entries in the possession bit map column 412 is a storage area having at least n bits, which indicates the maximum number of snapshots, and each bit corresponds to a snapshot number. Each bit indicates whether there is reference to a corresponding block in the differential volume 116 ("1" indicates that there is reference and "0" indicates that there is no reference) as a block which forms a virtual volume to access a corresponding snapshot data.

When copying block data in the operational volume 115 to the differential volume 116 in writing to the operational volume 115, the writing processing subprogram 201 updates a bit in the possession bit map corresponding to a snapshot number that references the block with "1". Further, when obtaining an free block from the differential volume 116, a block having a possession bit map in which all bits are "0" is selected.

Further, when deleting a snapshot, the snapshot deletion subprogram 204 updates the bits in the possession bit map corresponding to the snapshot to be deleted for all blocks which form the virtual volume corresponding to the snapshot to be deleted with "0".

The preceding copy area address column 413 indicates whether blocks in the differential volume 116 are used as a preceding copy area or not.

To describe the contents of the differential block management table 212 shown in FIG. 4 more specifically, in a first row (401) "11 . . . 1" is registered as a possession bit map of the block address 0 in the differential volume 116 indicating that the blocks at the block address 0 in the differential volume 116 are all used in snapshot. This corresponds to that the contents at the block address 0 in the virtual volumes 1, 2, and n corresponding to the snapshots 1, 2, and n are stored in the differential volume 116 at the block address 0 as defined in the first row (301) of the snapshot management table 211 (FIG. 3).

Also, the "none" assigned to the preceding copy area address 413 of the first row (401) indicates that the block of the block address 0 in the differential volume 116 is not used as a preceding copy area.

In a second row (402) "10 . . . 0" is registered as a possession bit map of the block address 1 in the differential volume 116, and this indicates that the block at the block address 1 in the differential volume 116 is used in the snapshot 1 corresponding to the first bit of the possession bit map (i.e., forming the virtual volume 1), but not used in other snapshots. This corresponds to that the contents of the block address 1 in the virtual volume 1 corresponding to the snapshot 1 are stored in the differential volume 116 at the block address 1 as defined in the second row (302) of the snapshot management table 211 (FIG. 3). Also, the "none" assigned to the preceding copy area address 413 indicates that the block at the block address 1 in the differential volume 116 is not used as a preceding copy area.

In a third row (403) "01 . . . 0" is registered as a possession bit map of the block address 2 in the differential volume 116. This indicates that the block at the block address 2 in the differential volume 116 is used in the snapshot 2 corresponding to the second bit of the possession bit map (i.e., forming the virtual volume 2). This corresponds to that the contents of the block address 1 in the virtual volume 2 corresponding to the snapshot 2 are stored in the differential volume 116 at the block address 2 as defined in the second row (302) of the snapshot management table 211 (FIG. 3). Also, the "none" assigned to the preceding copy area address 413 indicates that the block at the block address 2 in the differential volume 116 is not used as a preceding copy area.

In a fourth row (404) "00 . . . 0" is registered as a possession bit map of the block address 3 in the differential volume 116. This indicates that the block at the block address 3 in the differential volume 116 is neither referenced nor used by any snapshot. Further, the preceding copy area address 413 is "2" indicating that the block at the block address 3 in the differential volume 116 is used as a preceding copy area of the block address 2 in the operational volume 115.

Hereafter it is set in the same way to the row (p-1) (406).

Namely, if at least one bit of the possession bit map 412 is "1", the block in the differential volume 116 is used for the snapshot. Also, if all bits of the possession bit map 412 are "0" and the preceding copy area address 413 is registered, the block in the differential volume 116 is a preceding copy data storage block which is used as a preceding copy area. Further, if all bits of the possession bit map 412 are "0" and the preceding copy area address 413 is not registered, the block in the differential volume 116 is an free block which is not used for any preceding area.

Hereafter, processing flows of respective subprograms in the snapshot management program 124 will be described.

Figure 5:
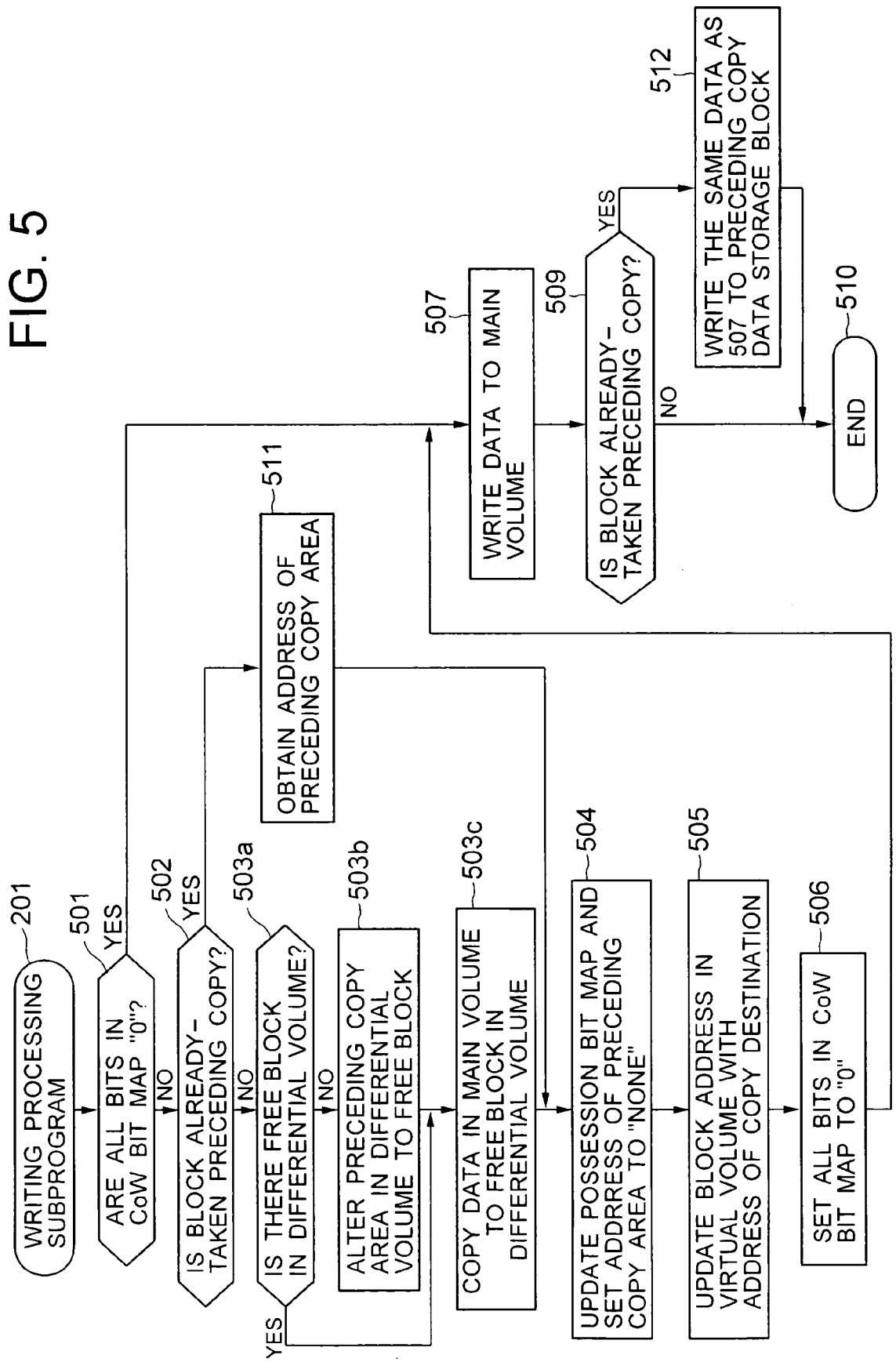
FIG. 5 is a flowchart showing the process of a writing processing subprogram 201 of the first embodiment.

FIG. 5 is a flowchart showing the process of the writing processing subprogram 201 in the snapshot management program 124 of the first embodiment.

In the writing processing, first, the snapshot management table 211 is referenced, and it is determined whether all bits of the CoW bit map column 312 corresponding to the block address column 311 which is the object of the writing processing are "0" or not (501).

If all bits are "0", it means that data of the block has been updated after the final snapshot taking request was issued and all the virtual volumes are already made corresponding to the differential volume 116 respect to this block. Therefore, if all bits of the CoW bit map are "0", there is no need to copy data preceding update to the differential volume 116, the processing proceeds to step 507 and writes data to the block in the operational volume (main volume) specified by the file system processing program 123.

On the other hand, if at least one bit is "1", it means that there is a snapshot (virtual volume) which references the data in the operational volume 115 which is to be updated by the writing processing, the process proceeds to step 502 to perform CoW.

At the step 502, the preceding copy area address column 413 of the differential block management table 212 (FIG. 4) is referenced and it is determined whether the block address of the block which is the writing object in the operational volume 115 is registered in the preceding copy area address column 413 of the differential block management table 212 or not. Thereby, it is determined whether the data of the writing object block in the operational volume 115 is already taken a preceding copy to the differential volume 116 or not (502).

If the block address of the writing object block is registered in the differential block management table 212, data stored in the writing object block is already stored in the differential volume 116. Consequently, there is no need to copy data preceding its update stored in the writing object block to the differential volume 116, and it only needs to make the block in the differential volume 116 where the data is stored (taken a preceding copy) corresponding to the virtual volume. For this, the writing processing subprogram 201 first references the differential block management table 212 to obtain the block address 411 in the differential volume 116 which is registered corresponding to the block address of the writing object block, and writes it to the memory 114 temporarily (511). This address will be used as an address corresponding to the writing object block in the virtual volume at step 505 which will be described later.

Thereafter, the process proceeds to step 504. By this process the data which is already taken a preceding copy to the differential volume 116 can be used as data in the virtual volume, i.e., as snapshot data.

On the other hand, if the block address of the writing object block is not registered in the preceding copy area address column of the differential block management table 212, the differential block management table 212 (FIG. 4) is referenced and it is determined whether there is an free block in the differential volume 116 or not (503a). As a result, if there is no free block in the differential volume 116, the process searches a preceding copy data storage block (a block with all bits in the possession bit map 412 set to "0" and with the preceding copy area address 413 registered) from blocks in the differential volume 116, discards storage contents of the address 413 (FIG. 4) of the preceding copy area (preceding copy data storage block) in the differential block management table 212 (updates the preceding copy area address with "none"), alters the preceding copy area block used as a preceding copy area in the differential volume 116 to an free block (503b), and proceeds to step 503c. On the other hand, if there is an free block in the differential volume 116, the process proceeds to step 503c without performing the process of the step 503b.

Next, the process copies data preceding its update stored in the block in the operational volume 115 to which the writing is to be performed to the free block in the differential volume 116 (503c). By this process from 503a to 503c, an free block is secured in the differential volume 116 and the data preceding its update stored in the operational volume 115 is copied to the free block (if there is no free block in the differential volume 116, the process copies the data to an area used as a preceding copy area and makes it a snapshot area).

Then, the process stores the value of the CoW bit map referenced at the step 501 in the possession bit map column 412 of the differential block management table 212 corresponding to the address of the block in the differential volume 116 which became a copy destination of the data at the step 503c. Also, the process sets the preceding copy area address 413 corresponding to the address of the block in the differential volume 116 to "none" (504).

Then the process specifies a virtual volume corresponding to the bit which has the value of "1" in the CoW bit map referenced at the step 502 from among the virtual volumes registered in the snapshot management table 211. Then the process updates the snapshot management table 211 so that the block corresponding to the writing object block in the specified virtual volume corresponds to the differential volume 116 which became the copy destination of the data at the step 503. Namely, the process registers the address of the block in the differential volume 116 which became the copy destination of the data at the step 503 in a row corresponding to the writing object block address of a column corresponding to the specified virtual volume in the snapshot management table 211. Also, the address of the preceding copy area obtained at the step 511 is registered as an address of differential data of the snapshot.

Next, the value of all bits in the CoW bit map referenced at the step 501 is updated with "0" (506).

Namely, by the process up to the step 506, an free area in the differential volume 116 is used as snapshot data or a preceding copy area in the differential volume 116 is used as snapshot data.

Thereafter, the specified data is written to the block indicated by the specified block address in the operational volume 115 (507).

Then, in the same way as the process at the step 502, it is determined whether the block to which the data was written is a block already taken a preceding copy or not referencing the preceding copy area address column 413 of the differential block management table 212 (FIG. 4) (509).

If preceding copy data of the block exists in the differential volume 116, the process writes the same data as was written to the operational volume 115 at the step 507 to the block which is used as a preceding copy area of the block in the differential volume 116 (512), and terminates the writing processing subprogram 201 (510). By this process, contents of the preceding copy area can be kept up to date.

On the other hand, if preceding copy data of the block does not exist in the differential volume 116, the process terminates the processing of the writing processing subprogram 201 without performing the process of the step 512 (510).

Figure 6:
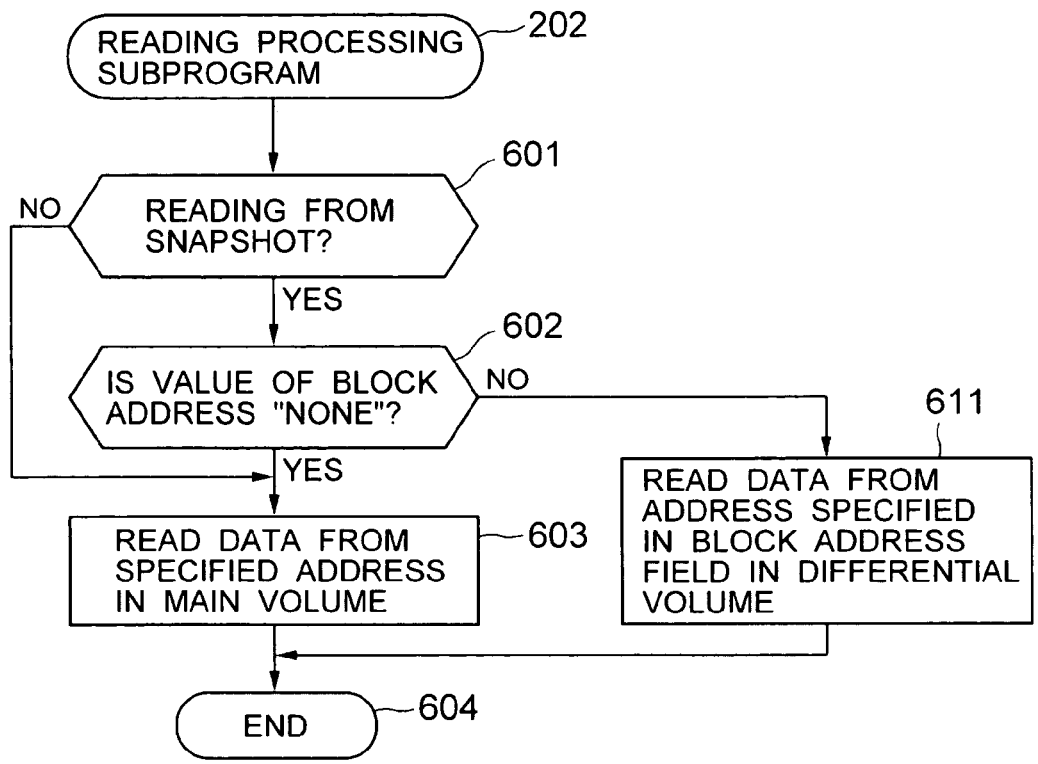
FIG. 6 is a flowchart showing the process of a reading processing subprogram 202 of the first embodiment.

FIG. 6 is a flowchart showing the process of the reading processing subprogram 202 of the snapshot management program 124 of the first embodiment.

In the reading processing, first, it is determined whether the reading is reading from the snapshot or not by checking whether the reading object volume specified by the file system processing program 123 is the operational volume 115 or the virtual volume (601).

As a result, if the read request received from the file system processing program 123 is for the operational volume 115, it is determined that it is not a read request for the snapshot, and data is read out from the block address specified by the file system processing program 123 in the operational volume 115 (603).

On the other hand, if the read request received from the file system processing program 123 is for the virtual volume, it is determined that it is a read request for the snapshot, and the process proceeds to step 602. Then further, the value corresponding to the block address specified by the file system processing program 123 in the reading object virtual volume is referenced using the snapshot management table 211 (FIG. 3) and it is determined whether the value is "none" or not (602).

As a result, if the value corresponding to the block address in the virtual volume is "none", as data at the reading object block in the virtual volume corresponding to the reading object snapshot is not stored in the differential volume 116, data is read out from the specified block address in the operational volume 115 (603).

On the other hand, if the value of the block address referenced at the step 602 is not "none", the reading object block address in the virtual volume corresponds to a block address in the differential volume 116. Namely, data at the reading object block address in the virtual volume is stored in the differential volume 116. Then, data is read out from the block address in the differential volume 116 referenced at the step 602 (611).

Subsequently, the block data which was read out is returned to the file system processing program 123 and the process of the reading processing subprogram 202 is terminated (604).

Figure 7:
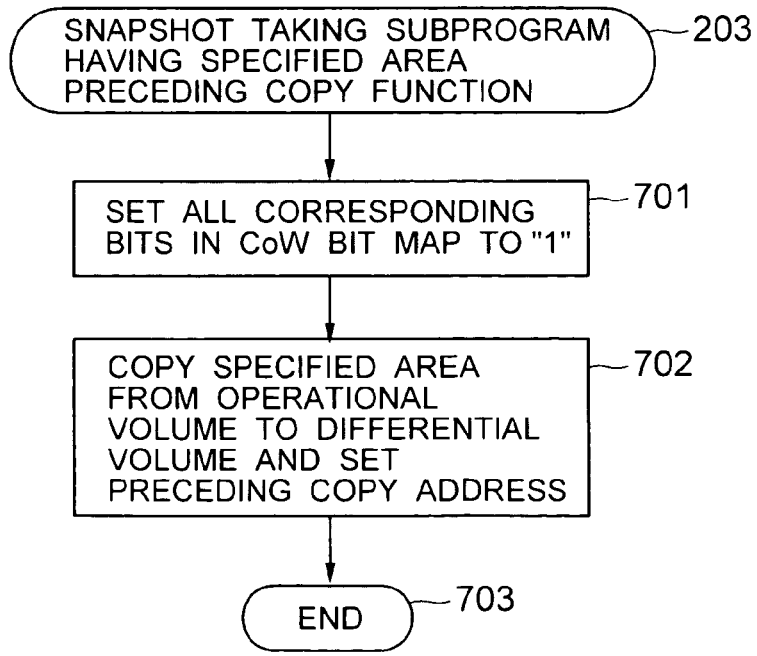
FIG. 7 is a flowchart showing the process of a snapshot taking subprogram 203 of the first embodiment.

FIG. 7 is a flowchart showing the process of the snapshot taking subprogram 203 of the snapshot management program 124.

In the snapshot taking subprogram 203 of the snapshot management program 124 of the first embodiment, when it receives a snapshot taking request from the data protection program, it registers newly a virtual volume in the snapshot management table 211 (FIG. 3). Then, it sets a bit corresponding to the newly registered virtual volume corresponding to a newly taking snapshot to "1", and sets block addresses of the virtual volume corresponding to the newly taking snapshot to all "none" (701).

Thereafter, by writing data read out from an area specified as a snapshot taking object in the operational volume 115 to the differential volume 116, the process copies data stored in the specified area from the operational volume 115 to the differential volume 116. Then, it writes a preceding copy area address to the block address column of a block which is to be used as a preceding copy area in the differential block management table 212 (FIG. 4) (702).

Then, the process of the snapshot taking subprogram 203 is terminated (703).

Herein, at the above-mentioned step 701, the value of the bit corresponding to the newly created virtual volume of the all CoW bit maps 312 registered in the snapshot management table 211 is set to "1". However, if there is an unused block in the operational volume 115, a block in the virtual volume corresponding to this unused block also becomes an unused block. In this case it may be configured that a bit corresponding to the newly created virtual volume is set to "1" only for the blocks except the unused block of the CoW bit map for the unused block which exists in the newly created virtual volume. Here, an unused block is a block which is not assigned to store data (file, directory, etc.) and a block which is prepared to store data when a file or a directory is newly created in the future or when size is expanded.

Even if a write request for an unused block is issued and data stored in the unused block is updated, a snapshot in the file system never references data in the unused block, and consequently update of the data does not affect the snapshot in the file system. Therefore, if an unused portion is updated after taking of the snapshot and the CoW bit for the unused block is "0" at the time of taking the snapshot, data preceding its update is not copied to the differential volume 116, and the data update in the unused block is reflected to the snapshot, contents being changed from those obtained at the time of taking the snapshot. In the file system using the snapshot, however, contents of the file or directory in the file system are not affected. Therefore, with the CoW bit for the unused block set to "0" when taking the snapshot, it becomes possible to reduce the amount of occurrence of difference.

Figure 8:
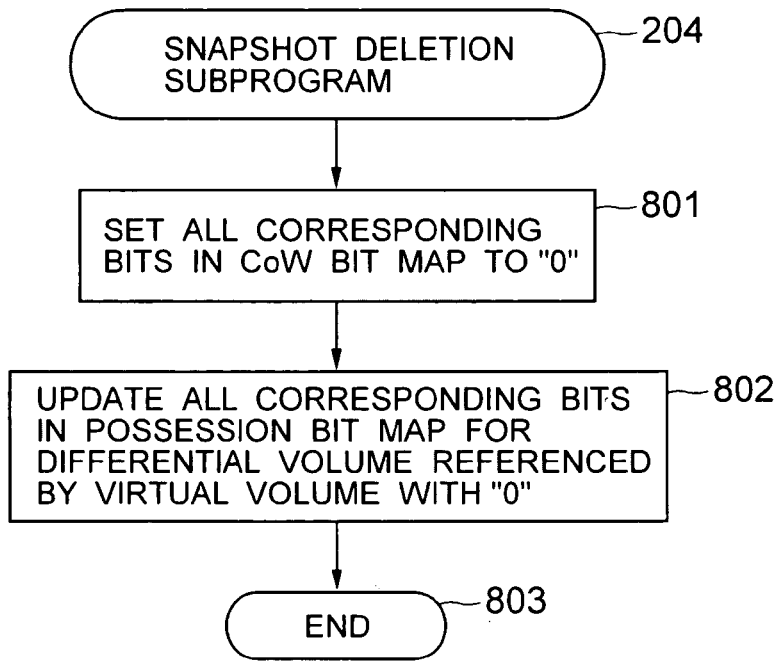
FIG. 8 is a flowchart showing the process of a snapshot deletion subprogram 204 of the first embodiment.

FIG. 8 is a flowchart showing the process of the snapshot deletion subprogram 204 of the snapshot management program 124 of the first embodiment.

When a snapshot deletion request from the data protection program 122 is received, bits corresponding to the deletion object snapshot (a virtual volume) specified by the deletion request for all CoW bit maps 312 stored in the snapshot management table 211 (FIG. 3) are updated with "0" (801).

Further, for a block in the differential volume 116 corresponding to a block in the virtual volume corresponding to the deletion object snapshot (for example, if the virtual volume corresponding to the deletion object snapshot is the virtual volume 2, a block indicated by a block address registered in the column 314), bits for the virtual volume corresponding to the deletion object snapshot in the possession bit map 412 of the differential block management table 212 are updated with "0" (802).

Thereafter, the registration of the virtual volume corresponding to the deletion object snapshot is deleted from the snapshot management table, and the process of the snapshot deletion subprogram 204 is terminated (803).

As described above, according to the first embodiment of the present invention data in the operational volume 115 is previously stored in the differential volume 116 as preceding copy data, the block in the differential volume 116 is used as a preceding copy area, the preceding copy data is used as already copied data at the time when the data is written, thereby it is possible to reduce the frequency of occurrence of CoW and improve the access performance for the disk apparatus.

Also, according to the snapshot taking processing (FIG. 7) of the first embodiment, data read out from the specified area in the operational volume 115 at the time of taking a snapshot is stored in an free area in the differential volume 116, and the address of the preceding copy area is recorded, thereby it is possible to reduce the frequency of occurrence of CoW by creating preceding copy data preceding an access to the area and improve the access performance for the disk apparatus.

Namely, in the snapshot of the prior art, when writing to the operational volume 115 the following process should be executed successively, namely, (1) read out information of a management table, (2) read out old data on the operational volume 115, (3) write the old data to the differential volume, (4) update information of the management table, and (5) perform regular write to the operational volume 115. Therefore, when writing to an area which is an object of copy-on-write, this process needs reading processing and writing processing two times respectively.

Also, at the time of taking a snapshot, by copying an area which is most likely to be updated later to the differential volume and making it already taken copy-on-write, it is possible to reduce area which is to be the object of copy-on-write and consequently reduce the above-mentioned area which needs reading processing and writing processing two times respectively, and reduce the occurrence of overhead. However, the differential volume 116 consumes its capacity in the amount of data copied. Also, the copy of a block which is not updated in the result would be vain.

According to the present invention, differential data of snapshot is stored in unused area of preceding copy data stored in the differential volume 116 which is used in copy-on-write snapshot, thereby, it is possible to use the capacity of the differential volume 116 effectively and enhance the chance to use copy of a block which is not updated in the result.

Next, it will be described an example of a variation of the first embodiment of the present invention.

Figure 9:
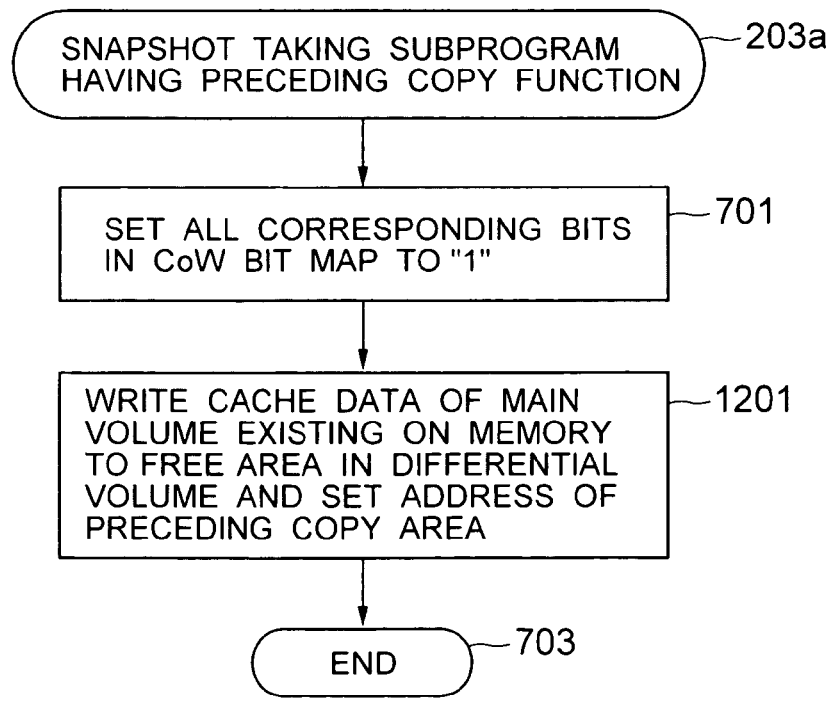
FIG. 9 is a flowchart showing the process of a snapshot taking subprogram 203a of an example of a variation of the first embodiment.

FIG. 9 is a flowchart showing snapshot taking processing of a snapshot taking subprogram 203a as an example of a variation of the first embodiment.

The snapshot taking processing 203a showed in FIG. 9 differs from the above-mentioned snapshot taking processing (FIG. 7) in that when taking a snapshot it writes data which was read out from the operational volume 115 and stored in the cache memory to the differential volume 116 and use it as preceding copy data.

In the snapshot taking subprogram 203a, when it receives a snapshot taking request from the data protection program, it newly registers a virtual volume in the snapshot management table 211 (FIG. 3). Then, it sets a bit corresponding to the virtual volume newly registered corresponding to a snapshot to be newly taken of all CoW bit maps 312 registered in the snapshot management table 211 to "1", and sets all block addresses of the virtual volume corresponding to a snapshot to be newly taken to all "none" (701).

Thereafter, cache data of the operational volume 115 which is stored in the cache memory provided in the memory 114 is written to an free area of the differential volume 116. Then, the preceding copy area address is written to the block address column of the block to be used as a preceding copy area of the differential block management table 212 (FIG. 4) (1201).

Thereafter, the process of the snapshot taking subprogram 203a is terminated (703).

In this manner, according to the snapshot taking subprogram 203a (FIG. 9) of a variation of the first embodiment, data read out from the operational volume 115 specified at the time of taking a snapshot and data written to the operational volume 115 are stored in the cache memory provided in the memory 114 in the server apparatus 101 (in a second embodiment which will be described later a cache memory provided in a memory 914 in a storage apparatus) as cache data. Therefore, by storing the data stored in the cache memory in an free area in the differential volume 116 and by recording its preceding copy area address, it becomes unnecessary to read out again the data stored in the differential volume 116 as preceding copy data from the disk apparatus. Also, as data stored in the cache memory is likely to be data which is accessed frequently, it can be properly selected without previously setting area to which a preceding copy is taken.

Figure 10:
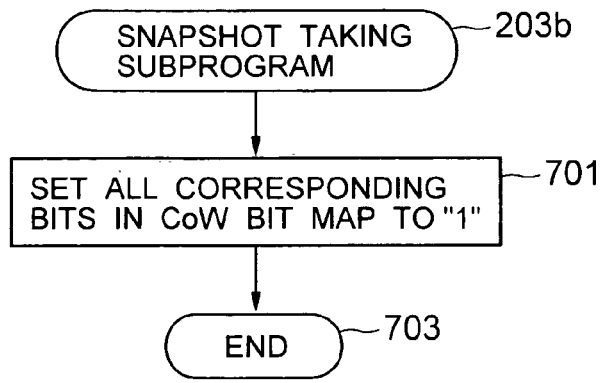
FIG. 10 is a flowchart showing the process of a snapshot taking subprogram 203b of an example of a variation of the first embodiment.

FIG. 10 is a flowchart showing snapshot taking processing of a snapshot taking subprogram 203b as a further example of a variation of the first embodiment.

The snapshot taking processing 203b showed in FIG. 10 differs from the above-mentioned snapshot taking processing 203 (FIG. 7) in that it does not take preceding copy at the time of taking a snapshot.

In the snapshot taking subprogram 203b, when it receives a snapshot taking request from the data protection program, it newly registers a virtual volume in the snapshot management table 211 (FIG. 3). Then, it sets a bit corresponding to the virtual volume newly registered corresponding to a snapshot to be newly taken of all CoW bit maps 312 registered in the snapshot management table 211 to "1", and sets block addresses of the virtual volume corresponding to a snapshot to be newly taken to all "none" (701).

Thereafter, the process of the snapshot taking subprogram 203b is terminated (703).

The snapshot taking subprogram 203b does not create preceding copy data at the time of taking a snapshot, but it is used with a reading processing subprogram 202a (FIG. 11), a writing processing subprograms 201a, 201b (FIG. 12, FIG. 13) which will be described later, and by these reading processing subprogram 202a or writing processing subprograms 201a, 201b data is stored in a preceding copy area.

Figure 11:
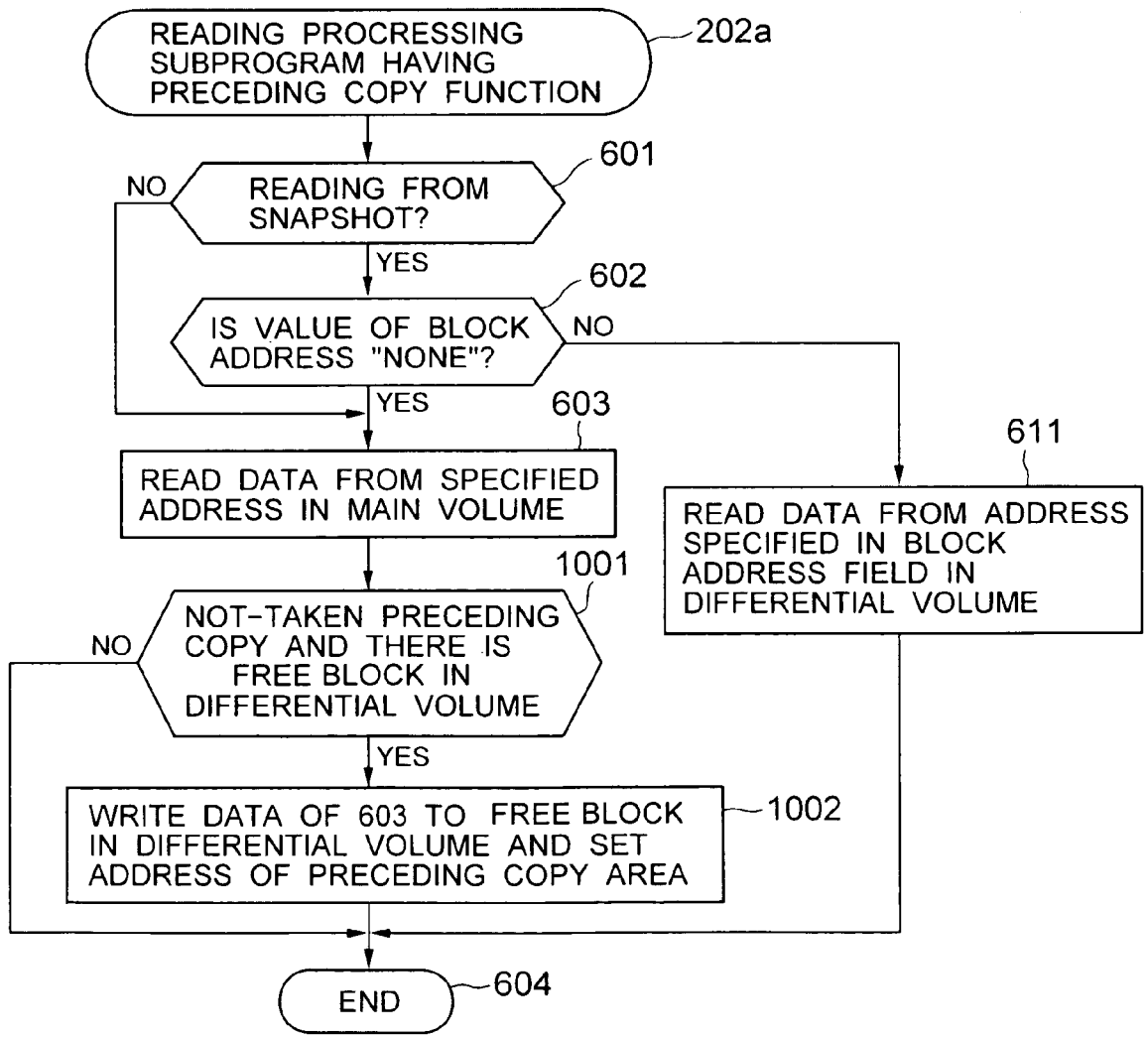
FIG. 11 is a flowchart showing the process of a reading processing subprogram 202a of an example of a variation of the first embodiment.

FIG. 11 is a flowchart showing the process of the reading processing subprogram 202a as an example of a variation of the first embodiment.

The reading processing 202a shown in FIG. 11 differs from the above-mentioned reading processing of the first embodiment (FIG. 6) in that it takes preceding copy by writing data read out from the operational volume 115 to an free block in the differential volume 116.

In the reading processing 202a, first, it is determined whether the reading is reading from the snapshot or not by checking whether the reading object volume specified by the file system processing program 123 is the operational volume 115 or the virtual volume (601).

As a result, if the read request received from the file system processing program 123 is for the operational volume 115, it is determined that it is not a read request for the snapshot, and data is read out from the block address specified by the file system processing program 123 in the operational volume 115 (603).

On the other hand, if the read request received from the file system processing program 123 is for the virtual volume, it is determined that it is a read request for the snapshot, and the process proceeds to step 602. Then further, the value corresponding to the block address specified by the file system processing program 123 in the reading object virtual volume is referenced using the snapshot management table 211 (FIG. 3) and it is determined whether the value is "none" or not (602).

As a result, if the value corresponding to the block address in the virtual volume is "none", as data at the reading object block in the virtual volume corresponding to the reading object snapshot is not stored in the differential volume 116, data is read out from the specified block address in the operational volume 115 (603).

On the other hand, if the value of the block address referenced at the step 602 is not "none", the reading object block address in the virtual volume corresponds to a block address in the differential volume 116. Namely, data at the reading object block address in the virtual volume is stored in the differential volume 116. Then, data is read out from the block address in the differential volume 116 referenced at the step 602 (611).

Subsequently, it is determined whether there is an free block which is not used for neither snapshot nor preceding copy area in the differential volume 116 or not referencing the differential block management table 212 (FIG. 4) (1001). As a result if there is an free block in the differential volume 116, the data is written from the specified block address in the operational volume 115 to the free block. Then, the address of the preceding copy area is written to the preceding copy area address column (413 of FIG. 4) of the block to be newly used as a preceding copy area (1002). By this process of the steps 1001 and 1002, if the data read out from the operational volume 115 is not taken a preceding copy, the data can be stored as preceding copy data.

Then, the block data which was read out is returned to the clients 131, 132 and the process of the reading processing subprogram 202a is terminated (604).

In this manner, according to the reading processing shown in FIG. 11, data read out from the operational volume 115 is stored in an free area in the differential volume 116 and the address of the free area is recorded as a preceding copy area address. Namely, as an area which is an object of the copy-on-write in the operational volume 115 is likely to be written after the data is referenced, by taking a preceding copy of the data, it is possible to reduce the frequency of occurrence of CoW and improve the access performance for the disk apparatus.

Figure 12:
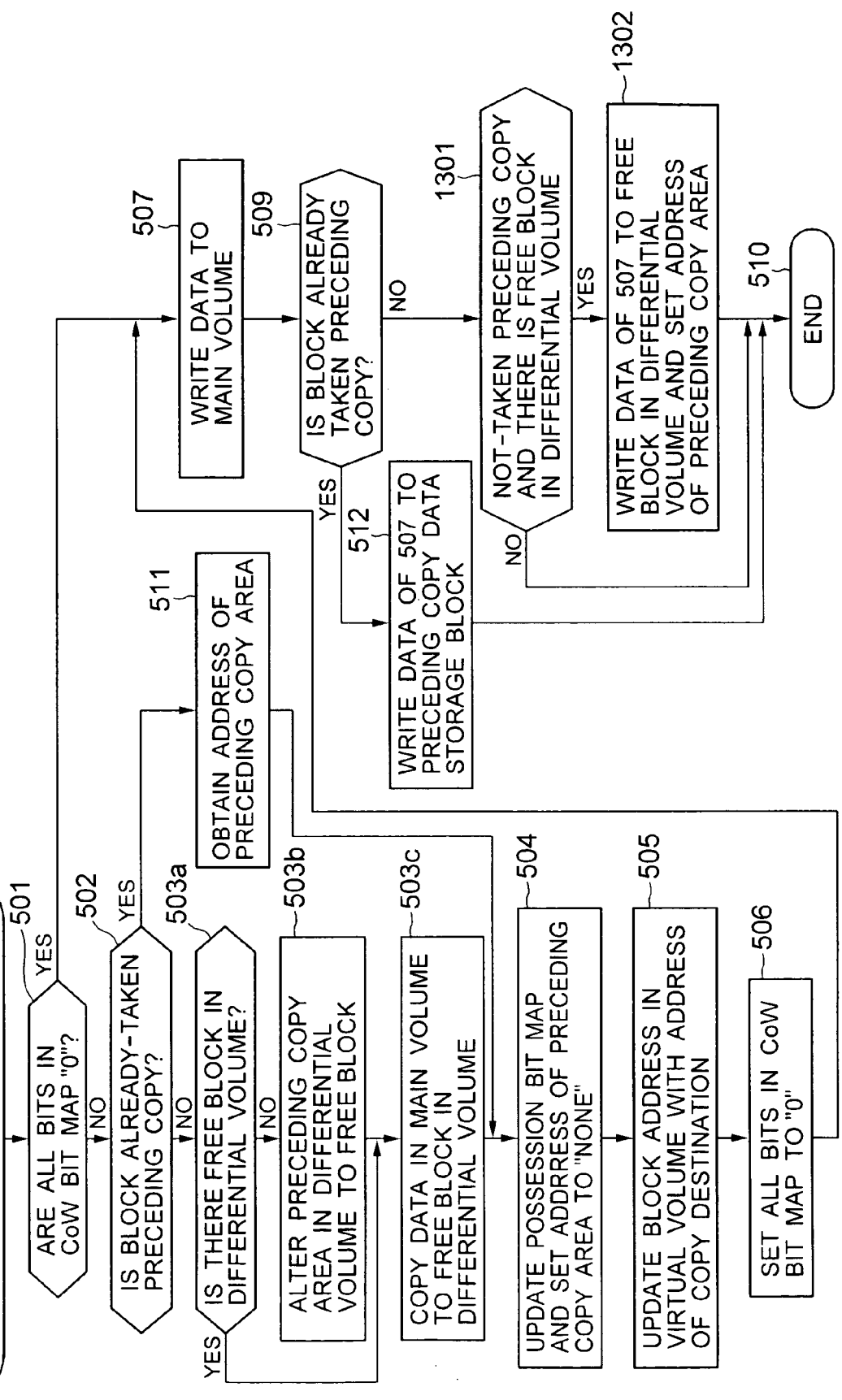
FIG. 12 is a flowchart showing the process of a writing processing subprogram 201a of an example of a variation of the first embodiment.

FIG. 12 is a flowchart showing the process of the writing processing subprogram 201a as an example of a variation of the first embodiment.

The writing processing 201a shown in FIG. 12 differs from the above-mentioned writing processing of the first embodiment (FIG. 5) in that it takes a preceding copy of data by writing the data to be written in the operational volume 115 to an free block.

In the writing processing subprogram 201a, similar to the above-mentioned first embodiment, the process of when copy-on-write is performed from the steps 501 to 506 and the step 511, as well as the process of when copy-on-write is not performed of the steps 507,509, and 512 are executed. Herein, the same sign is assigned to the same process as in the above-mentioned writing processing of the first embodiment (FIG. 5), and its details will be omitted.

In the writing processing shown in FIG. 12, similar to the above-mentioned first embodiment, at the step 501 it is determined whether all bits of the CoW bit map column 312 corresponding to the block address column 311 which is the object of the writing processing are "0" or not, and if all bits are "0", as it means that data has been updated after the final snapshot taking request was issued and there is no need to copy data preceding its update to the differential volume 116, the process proceeds to the step 507.

At the step 507 the specified data is written to the block indicated by the specified block address in the operational volume 115.

Thereafter, similar to the process of the step 502, it is determined whether the block to which the data was written is a block already taken a preceding copy or not referencing the preceding copy area address column 413 of the differential block management table 212 (FIG. 4) (509).

If there is preceding copy data of the block in the differential volume 116, the same data which was written to the operational volume 115 at the step 507 is written to the block in which the preceding copy data of the block is stored in the differential volume 116 (512), and the writing processing subprogram 201 is terminated (510).

On the other hand, if there is not preceding copy data of the block in the differential volume 116, it is determined whether there is an free block which is not used for neither snapshot nor preceding copy area in the differential volume 116 or not referencing the differential block management table 212 (FIG. 4) (1301). As a result, if there is an free block in the differential volume 116, the data to be written in the block indicated by the specified block address in the operational volume 115 is written to the free block. Then, the preceding copy area address is written to the preceding copy area address column (413 of FIG. 4) of the block which is to be newly used as a preceding copy area (1302).

Thereafter, the process of the writing processing subprogram 201a is terminated (510).

In this manner, according to the writing processing subprogram 201a, as the data to be written to an area which is already taken copy-on-write (not the object of copy-on-write) in the operational volume 115 is stored in the free area in the differential volume 116 and its preceding copy area address is recorded, it is possible to reduce the frequency of occurrence of CoW in the snapshot which will be taken next even when there are many local writings to the disk apparatus, and improve the access performance for the disk apparatus. Also, as the preceding copy can be taken without reading out data from the operational volume 115, the preceding copy can be taken at high speed.

Figure 13:
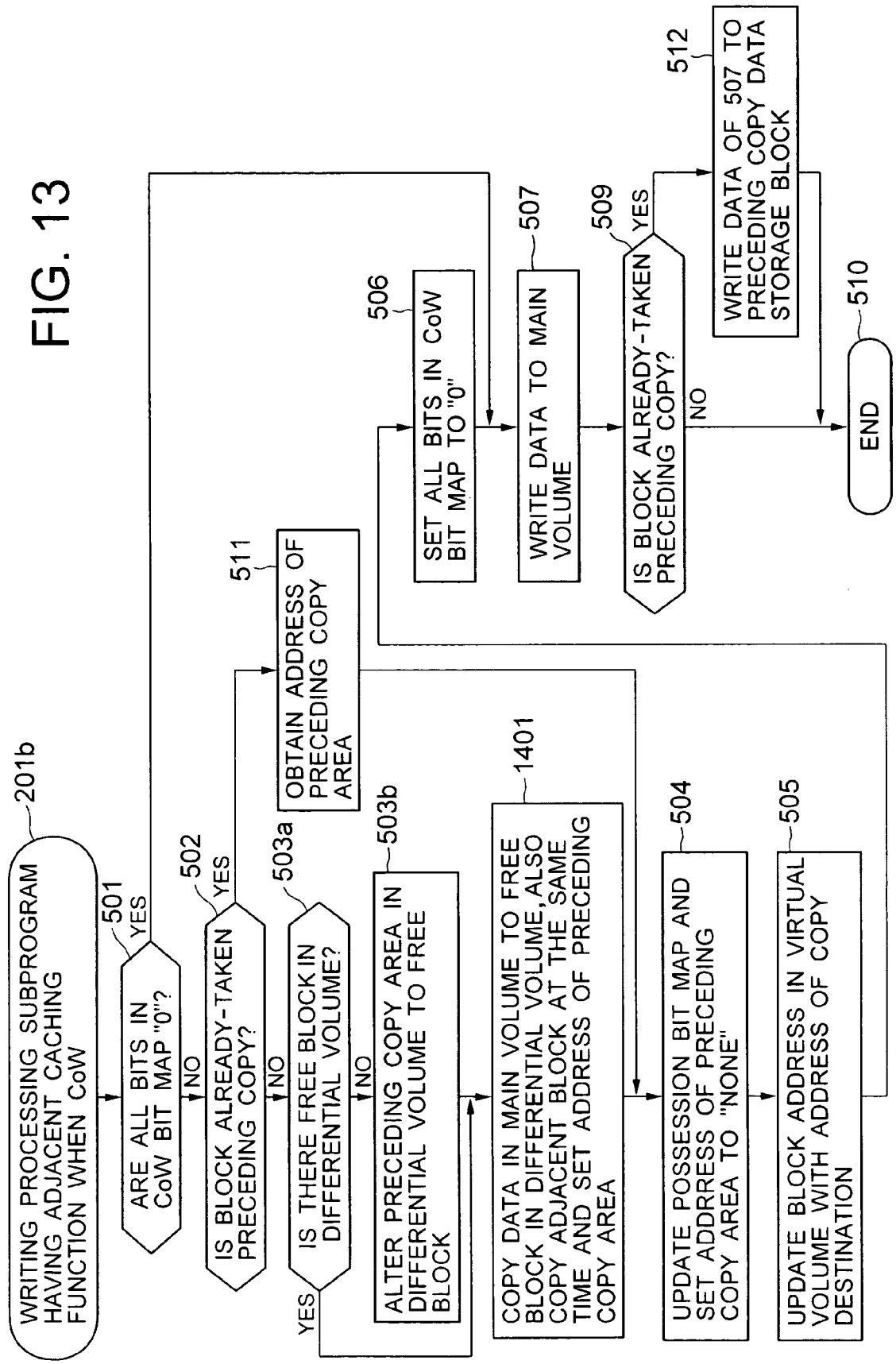
FIG. 13 is a flowchart showing the process of a writing processing subprogram 201b of an example of a variation of the first embodiment.

FIG. 13 is a flowchart showing the process of the writing processing subprogram 201b as an example of a variation of the first embodiment.

The writing processing 201b shown in FIG. 13 differs from the above-mentioned writing processing of the first embodiment (FIG. 5) in that it takes the preceding copy writing data read out from an area adjacent to an area to which the copy-on-write processing is to be performed in the operational volume 115 to an free block. To be more specific, the processing of copying also the adjacent block is performed in stead of the step 503c of the writing processing of the first embodiment (FIG. 5) (1401).

At the step 1401, next, data read out from a block indicated by the specified block address in the operational volume 115 is written to an free block. Then, data is also read out from a block adjacent to the specified block address in the operational volume 115 and the data read out is written to an free block in the differential volume 116. Then, the preceding copy area address is written in the preceding copy area address column (413 of FIG. 4) of the block which is to be newly used as a preceding copy area.

Thereafter, the process of the step 504 and after this is performed in the same way as in the writing processing of the first embodiment (FIG. 5).

In this manner, according to the writing processing 201b, data read out from an area adjacent to an area to which the copy-on-write processing is to be executed in the operational volume 115 is stored in an free area in the differential volume 116 and its preceding copy area address is recorded. Namely, as it is highly probable that data will be read out from a block adjacent to a block from which data was read out in the operational volume 115, by reading out data from the adjacent block and taking a preceding copy of it, it is possible to reduce the frequency of occurrence of CoW and improve the access performance for the disk apparatus.

Herein, as the differential volume 116 is used as a preceding copy area and preceding copy data is stored in it by any of the processing shown in FIGS. 11, 12, and 13, the differential volume 116 is used as a preceding copy area and preceding copy data is stored in it by any one of these processing or any combination of these processing shown in FIGS. 11, 12, and 13.

Next, a second embodiment of the present invention will be described. The process performed in the second embodiment is similar to that of the above-mentioned first embodiment except that the second embodiment is provided with hardware shown in FIG. 14. In the second embodiment the same sign is assigned to a configuration which has the same function as in the above-mentioned first embodiment, and its detailed description will be omitted.

Figure 14:
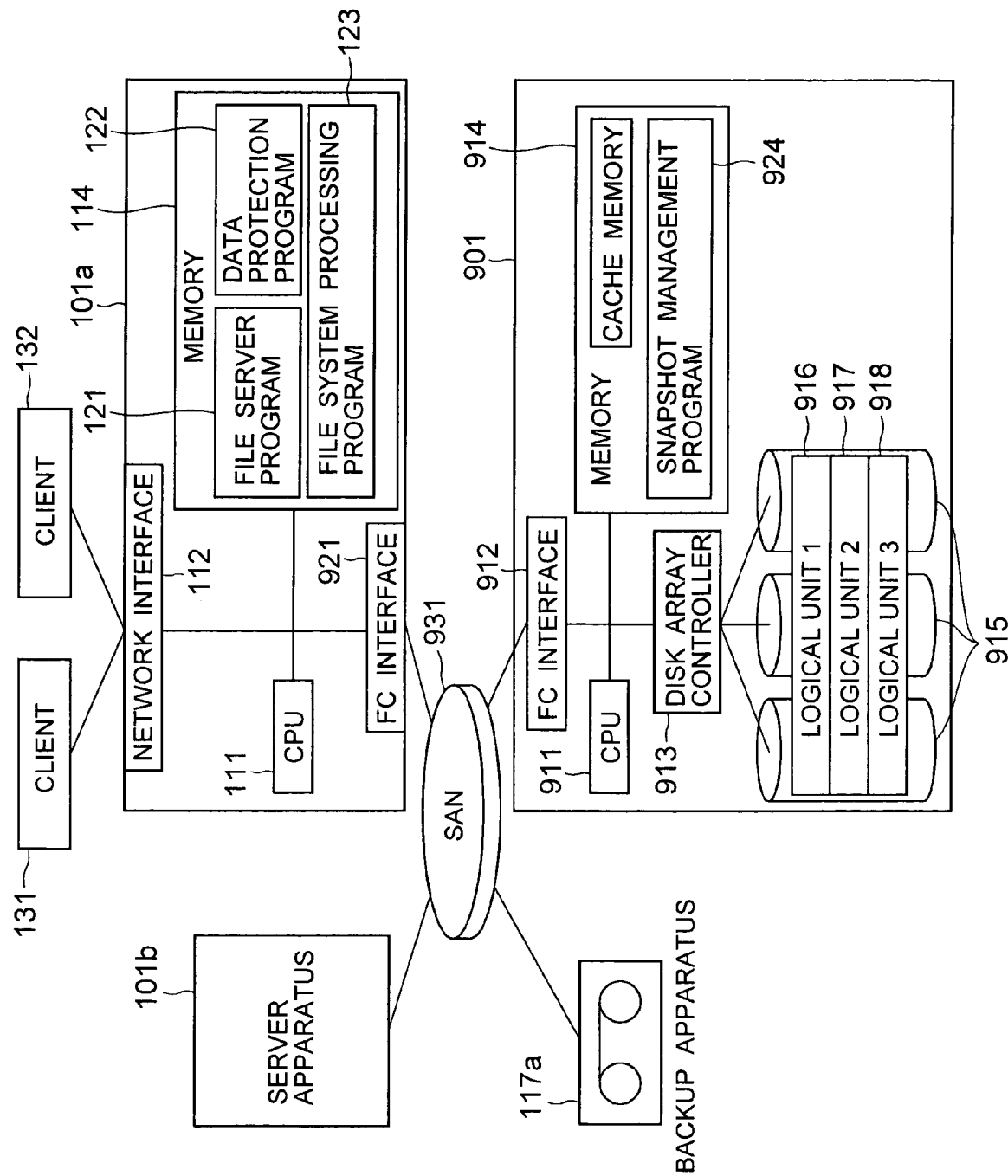
FIG. 14 is a block diagram showing a configuration of a storage system of a second embodiment of the present invention.

FIG. 14 is a block diagram showing a configuration of a storage system according to the second embodiment of the present invention.

The storage system of the second embodiment is configured by server apparatuses 101a, 101b to which a plurality of clients are connected, a storage apparatus 901 which stores data which the server apparatuses need, and a backup apparatus 117 which stores duplicate of data stored in the storage apparatus 901, with these apparatuses connected by a SAN (Storage Area Network) 931 which consists of an FC switch, etc.

The server apparatus 101a provides clients 131 and 132 connected via a network interface 112 with file share service.

The server apparatus 101a includes at least one CPU 111, at least one network interface 112, at least one FC (Fibre Channel) interface 921, and a memory 114. Herein, as the server apparatus 101b is provided for backup and has the same configuration as the server apparatus 101a, its detailed description will be omitted.

The FC interface 921 sends and receives signals (command, data) by the Fibre Channel protocol to and from the SAN (Storage Area Network) 931 and makes an operation on the storage apparatus 901 possible.

In the memory 114, a file server program 121, a data protection program 122, and a file system processing program 123 are stored, and a plurality of kinds of process are performed by the CPU 111 calling and executing these programs.

The storage apparatus 901 includes at least one CPU 911, at least one FC interface 912, at least one disk array controller 913, a memory 914, and at least one disk apparatus 915.

The disk array controller 913 sends and receives signals (command, data) based on a given interface (for example, SCSI) to and from the disk apparatus 915.

The disk apparatus 915 includes logical units 916, 917, and 918 which consist of a plurality of logical disk apparatuses.

In the memory 914 a snapshot management program 924 is stored and a plurality of kinds of process are performed by the CPU 911 calling and executing these programs.

The snapshot management program 924 can provide a virtual volume which uses a snapshot in the same way as the first embodiment, for example, by assigning the operational volume to the logical unit 916 and assigning the differential volume to the logical unit 917. By making the virtual volume usable as a virtual logical unit, it becomes possible for each apparatus on the SAN 931 to use snapshot. Also, as the snapshot management program 924 is included in the storage apparatus 901, snapshot can be realized in the storage apparatus. Moreover, the snapshot management program 924 provides a function similar to that of the above-mentioned snapshot management program 124.

Herein, by using the virtual logical unit the server apparatus 101a can execute the data protection program 122 in the same way as the first embodiment of the present invention.

Moreover, the server apparatus 101b also can use the virtual logical unit provided by the storage apparatus 901 via the SAN 931. Thereby, the server apparatus 101b for backup can preserve contents of the virtual logical unit provided by the storage apparatus 901, i.e., snapshot image, in a backup apparatus 117a connected to the SAN 931.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A storage system comprising a server apparatus including at least one storage interface, and, at least one disk apparatus connected to the storage interface including an operational volume which performs ordinary read/write and a differential volume which stores differential data of snapshot of the operational volume, wherein:
   the server apparatus includes:
      a file server part which accesses the disk apparatus in response to a file access request sent to the server apparatus;
      a data protection part which controls taking of snapshot;
      a file system processing part which issues an access processing to a snapshot management part in response to a request from the file server part and the data protection part; and
      a snapshot management part which manages the differential volume and maintains taken snapshot; and
   the snapshot management part:
      provides a preceding copy area to store data, when the data is written and stored in the operational volume in the differential volume and records location information of an area in the operational volume in which said data was stored; and
      discards the stored location information and uses the preceding copy area as an free area if free area in the differential volume becomes insufficient,
   wherein said snapshot management part includes a differential block management table comprising a plurality of columns each having fields for differential volume block address, possession bit map, and preceding copy area address for recording said location information; and
   wherein said differential volume address represents a differential volume block address in said differential volume, said possession bit map represents whether the block in said differential volume indicated by said differential volume block address is used in respective snapshots, and said preceding copy area address indicates whether a block in said differential volume indicated by said differential volume block address is being used as a preceding copy area or not, and if being used as a preceding copy area, a block address of the copied block in said preceding copy area is indicated in the field of said preceding copy area address.

2. Storage system comprising a server apparatus including at least one storage interface, and at least one disk apparatus connected to the storage interface, wherein:
   the disk apparatus includes an operational volume which performs ordinary read/write and a differential volume which stores differential data of snapshot of the operational volume;
   the server apparatus or the disk apparatus includes a snapshot management part which manages the differential volume and maintains taken snapshot; and
   the snapshot management part:
      provides a preceding copy area to store data, when the data is written and stored in the operational volume in the differential volume and records location information of an area in the operational volume in which said data was stored; and
      discards the stored location information and uses the preceding copy area as an free area if free area in the differential volume becomes insufficient,
   wherein said snapshot management part includes a differential block management table comprising a plurality of columns each having fields for differential volume block address, possession bit map, and preceding copy area address for recording said location information, respectively; and
   wherein said differential volume address represents a differential volume block address in said differential volume, said possession bit map represents whether the block in said differential volume indicated by said differential volume block address is used in respective snapshots, and said preceding copy area address indicates whether a block in said differential volume indicated by said differential volume block address is being used as a preceding copy area or not, and if being used as a preceding copy area, a block address of the copied block stored in said preceding copy area is indicated in the field of said preceding copy area address.

3. A server apparatus including at least one storage interface, with a disk apparatus connected to the storage interface including an operational volume which performs ordinary read/write and a differential volume which stores differential data of snapshot of the operational volume, wherein:

the server apparatus includes a snapshot management part which manages the differential volume and maintains taken snapshot;

the snapshot management pad:

provides a preceding copy area to store data, when the data is written and stored in the operational volume in the differential volume and records location information of an area in the operational volume in which said data was stored; and discards the stored location information and uses the preceding copy area as an free area if free area in the differential volume becomes insufficient, wherein said snapshot management part includes a differential block management table comprising a plurality of columns each having fields for differential volume block address, possession bit map, and preceding copy area address for recording said location information, respectively; and wherein said differential volume address represents a differential volume block address in said differential volume, said possession bit map represents whether the block in said differential volume indicated by said differential volume block address is used in respective snapshots, and said preceding copy area address indicates whether a block in said differential volume indicated by said differential volume block address is being used as a preceding copy area or not, and if being used as a preceding copy area, a block address of the copied block stored in said preceding copy area is indicated in the field of said preceding copy area address.

4. A storage system comprising a server apparatus including at least one storage interface, and at least one disk apparatus connected to the storage interface, wherein:

the disk apparatus includes an operational volume which performs ordinary read/write and a differential volume which stores differential data of snapshot of the operational volume;

the server apparatus or the disk apparatus includes a snapshot management part which manages the differential volume and maintains taken snapshot; and the snapshot management part provides a preceding copy area to store data, when the data is written and stored in the operational volume in the differential volume and records location information of an area in the operational volume in which said data was stored, and discards the stored location information and uses the preceding copy area as a free area if free area in the differential volume becomes insufficient;

said snapshot management part stores data read out from a given area in the operational volume in a free area in the differential volume and records the location information; and said snapshot management part includes a differential block management table comprising a plurality of columns each having fields for differential volume block address, possession bit map, and preceding copy area address for recording said location information, respectively; wherein said differential volume address represents a differential volume block address in said differential volume, said possession bit map represents whether the block in said differential volume indicated by said differential volume block address is used in respective snapshots, and said preceding copy area address indicates whether a block in said differential volume indicated by said differential volume block address is being used as a preceding copy area or not, and if being used as a preceding copy area, a block address of the copied block stored in said preceding copy area is indicated in the field of said preceding copy area address.

5. A server apparatus including at least one storage interface, with a disk apparatus connected to the storage interface including an operational volume which performs ordinary read/write and a differential volume which stores differential data of snapshot of the operational volume, wherein:

the server apparatus includes a snapshot management part which manages the differential volume and maintains taken snapshot;

the snapshot management part provides a preceding copy area to store data when the data is written and stored in the operational volume in the differential volume and records location information of an area in the operational volume in which said data was stored, and discards the stored location information and uses the preceding copy area as a free area if free area in the differential volume becomes insufficient;

said snapshot management part stores data read out from a given area in the operational volume in a free area in the differential volume and records the location information; and said snapshot management part includes a differential block management table comprising a plurality of columns each having fields for differential volume block address, possession bit map, and preceding copy area address for recording said location information, respectively; wherein said differential volume address represents a differential volume block address in said differential volume, said possession bit map represents whether the block in said differential volume indicated by said differential volume block address is used in respective snapshots, and said preceding copy area address indicates whether a block in said differential volume indicated by said differential volume block address is being used as a preceding copy area or not, and if being used as a preceding copy area, a block address of the copied block stored in said preceding copy area is indicated in the field of said preceding copy area address.

* * * * *